United States Patent
Wessenhoven

[11] Patent Number: 5,987,872
[45] Date of Patent: Nov. 23, 1999

[54] BRAKE FOR AN OPEN-END SPINNING ROTOR

[75] Inventor: Heinz-Georg Wessenhoven, Mönchengladbach, Germany

[73] Assignee: W. Schlafhorst Ag & Co., Germany

[21] Appl. No.: 09/208,686

[22] Filed: Dec. 10, 1998

[30] Foreign Application Priority Data

Jan. 24, 1998 [DE] Germany ............................ 198 02 655

[51] Int. Cl.[6] ...................................................... D01H 4/00
[52] U.S. Cl. ................................................. 57/406; 57/88
[58] Field of Search ............................ 57/404, 406, 407, 57/414, 78, 88

[56] References Cited

U.S. PATENT DOCUMENTS

| | | | |
|---|---|---|---|
| 4,259,397 | 3/1981 | Saito et al. | 428/288 |
| 4,266,634 | 5/1981 | Hishida | 188/75 |
| 4,706,450 | 11/1987 | Feuchter et al. | 57/88 |
| 4,785,620 | 11/1988 | Feuchter | 57/88 |
| 4,989,401 | 2/1991 | Feuchter et al. | 57/406 |
| 5,046,590 | 9/1991 | Trema | 88/72.5 |
| 5,184,452 | 2/1993 | Stahlecker et al. | 57/78 |

FOREIGN PATENT DOCUMENTS

| | | |
|---|---|---|
| 32 24 874 A1 | 1/1984 | Germany . |
| 32 24 876 A1 | 1/1984 | Germany . |
| 8530124 | 2/1986 | Germany . |
| 36 30 256 A1 | 3/1988 | Germany . |
| 39 42 402 A1 | 6/1991 | Germany . |
| 38 20 328 C2 | 12/1993 | Germany . |
| 36 13 843 C2 | 12/1994 | Germany . |
| 196 18 261 A1 | 11/1997 | Germany . |

*Primary Examiner*—William Stryjewski
*Attorney, Agent, or Firm*—Kennedy Covington Lobdell & Hickman

[57] ABSTRACT

A rotor brake (8) for an open-end spinning rotor rotating at a high speed in a rotor housing with its rotor shaft (2) rotatably supported in the bearing nip (3) of a support-disk bearing (4). The rotor brake (8) comprises brake levers (9, 10) having a replaceable brake lining (16, 26) on their ends engagable against the rotor shaft (2). The brake linings (16, 26) are manufactured from a carbon-fiber composite material resistant to changes in temperature.

3 Claims, 1 Drawing Sheet

BRAKE FOR AN OPEN-END SPINNING ROTOR

BACKGROUND OF THE INVENTION

The present invention relates to a brake for an open-end spinning device and, more particularly, to a brake for an open-end spinning device having a rotor housing, a spinning rotor disposed in the rotor housing, and a support-disk bearing defining a bearing nip, wherein the spinning rotor is affixed to a shaft extending from the housing and rotatably supported in the bearing nip of the support-disk bearing for high speed rotation of the shaft and the rotor.

Open-end rotor spinning devices with brake devices which act on the rotor shaft of the spinning means are disclosed in numerous patent publications and have long been known in the state of the art.

For example, German Patent Publication DE 36 30 256 A1 describes a brake for an OE spinning rotor which brake comprises a brake lever with a brake lining placeable from below against the rotor shaft in combination with two pressure pad devices with cheeks similar to brake linings which act from above on the rotor shaft to hold down the shaft during braking. The cheeks of the holding-down devices have a different coefficient of friction than the brake lining arranged on the brake lever.

Moreover, German Patent Publications DE 36 13 843 C2, DE 39 42 402 A1 and DE 38 20 328 C2 teach rotor brakes which have tong or clamp-like arms arranged in mirror symmetry. The tong arms have an asbestos-free brake lining on their ends. When the brake is actuated, the brake linings are simultaneously placed on the rotor shaft and thus brake the spinning rotor from its high speed rotation during spinning operation to a standstill.

However, the known rotor brakes have the disadvantage that the service life of such brakes is relatively limited on account of the high stressing of the brake linings. That is, the frictional heat developing during the braking process causes the brake linings, which consist of a metal-containing, fiber-reinforced, asbestos-free and solvent-free material bound to artificial resin, to become glassy or vitreous over the course of time in the area where they contact the rotor shaft.

Such glassy brake linings adversely affect the functioning of the brake considerably since they result in distinctly longer braking times and therewith in a measurable loss of working efficiency of the entire open-end spinning machine. There is also the danger that the spinning-start carriage which services the open-end spinning machine may prematurely engage at a spinning location whose spinning rotor has not yet been completely braked. In this instance, both the service units of the spinning-start carriage as well as the open-end spinning device can experience considerable damage.

SUMMARY OF THE INVENTION

In view of the preceding state of the art, the present invention addresses has the problem and has the object of improving known rotor brakes, especially their brake linings.

The present invention solves this problem and achieves this objective by providing an improved brake device for open-end spinning devices of the type having a rotor housing, a spinning rotor disposed in the rotor housing, and a support-disk bearing defining a bearing nip. In such OE spinning devices, the spinning rotor is affixed to a shaft which extends from the housing and is rotatably supported in the bearing nip of the support-disk bearing for high speed rotation of the shaft and the rotor. According to the present invention, the improved brake for the spinning rotor comprises at least one brake lever having a brake lining and being selectively actuable to contact the rotor shaft with the brake lining, with the brake lining advantageously comprising a carbon-fiber composite material.

The use of a brake lining consisting of a carbon-fiber composite material has the advantage that such a material is very largely resistant to changes in temperature and has a very high wear resistance. Thus, the disadvantage of the previously described surface changes do not occur in the case of brake linings consisting of carbon-containing material, even after a rather long running time, so that it is assured that the rotor brake always has a uniform, high braking action over its entire service life.

For example, the service life of brake linings consisting of a carbon-fiber composite material is as a rule up to 6 times the service life of brake linings manufactured from the previously customary materials.

The brake linings are preferably fixed in a replaceable manner to brake levers. Thus, when necessary, worn brake linings can be easily removed and be replaced by new brake linings. The brake linings are either fixed directly on the brake lever via a clamping part loaded by a screw bolt, as described e.g. in German Patent Publication DE 38 20 328 C2, or as is described in the subsequently published German Patent Publication DE 197 35 973.6, positioned indirectly on the brake lever via a brake-lining holder detachably fixed on the brake lever.

In a preferred embodiment, the brake lining is designed as a symmetric component having at least two separate braking surfaces which can be brought successively into use by turning the brake lining about an axis of symmetry. Such brake linings with several braking surfaces correspondingly have a service life which is clearly extended in comparison to the service life of brake linings with only one braking surface.

Further details, features and advantages of the invention can be understood from an exemplary embodiment explained in the following description with reference made to the drawings.

DESCRIPTION OF THE PREFERRED EMBODIMENTS

Figure 1:
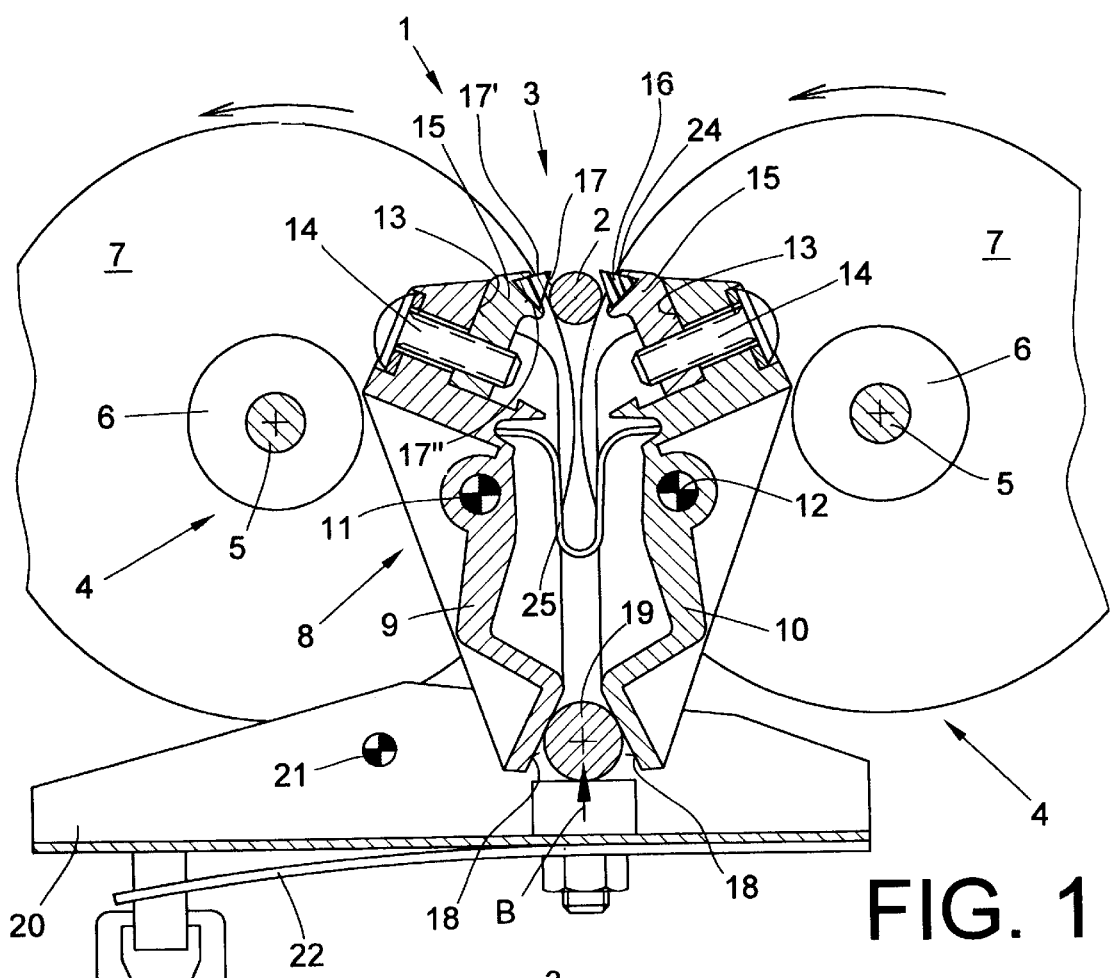
FIG. 1 is a schematic end view of an open-end rotor spinning device equipped with a tong-like rotor brake according to the present invention shown in a cross-sectioned elevational, the rotor brake having brake-lining holders detachably arranged on a pair of brake levers with each holder carrying a brake lining manufactured from carbon-fiber composite material with symmetrical alternatingly usable braking surfaces.

Referring now to the accompanying drawings and initially to FIG. 1, an openend rotor spinning device 1 is shown in schematic fashion and basically comprises a known spinning means (i.e., an OE spinning rotor), which is not shown in detail, rotatably mounted with its integral rotor shaft 2 in the bearing nip 3 of a support-disk bearing 4.

Such support-disk bearings, which are customary in conjunction with open-end rotor spinning devices, generally have two support-disk pairs each with front and back support disks 7 connected to rotate in unison via a common shaft 5. The respective shafts 5 of the support disk pairs are generally rotatably supported in roller bearings 6.

As is indicated in FIG. 1, rotor brake 8 is designed in the form of a tong-like mechanism which can be selectively placed on rotor shaft 2. The tong arms 9 and 10 of rotor brake 8 are rotatably supported by pivot shafts 11 and 12 for a limited degree of pivotal movement to serve as brake levers 9 and 10.

Figure 2:
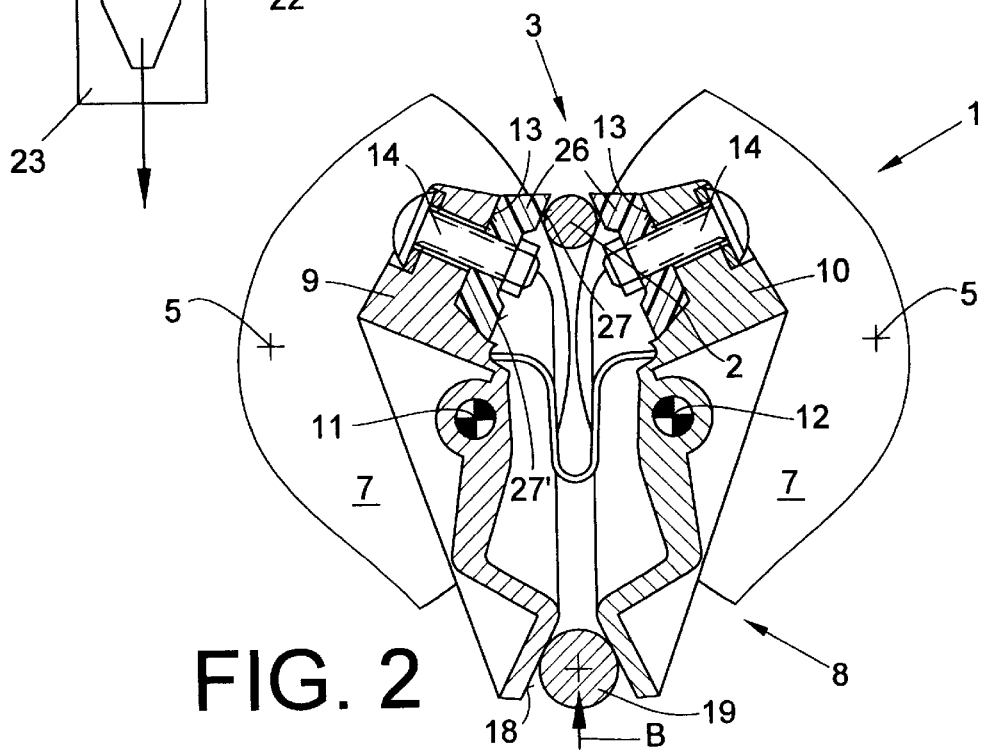
FIG. 2 is another schematic end view of an open-end rotor spinning device similar to FIG. 1, showing another embodiment of a rotor brake with carbon-fiber composite brake linings with alternatingly usable braking surfaces which can be clamped directly on the brake levers.

The operative end of each brake lever 9, 10 is formed with a bearing surface 13 at which are replaceably fixed by clamping bolts 14 either brake-lining holders 15, as indicated in FIG. 1 (such as are described in greater detail in German Patent Publication DE 197 35 973.6), or brake linings 26 designed as a symmetrically turnable component as indicated in FIG. 2.

Brake-lining holders 15 shown in FIG. 1 have a dovetail-shaped recess 24 in which a brake lining 16 of a triangular cross section can be fixed. Brake lining 16 is manufactured from carbon-fiber composite material and comprises three symmetrical braking surfaces 17, 17', 17" which can be selectively brought successively into use. Since the carbon-fiber composite material used not only has an extremely high wear resistance but is also very resistant to changes in temperature, the use of this material can prevent the brake linings from becoming glassy as the time of operation progresses and thereby prevent the rotor brakes from losing at least a part of their ability to function thereby.

In the embodiment shown in FIG. 2, brake lining 26 is also designed as a symmetrically turnable component. That is, in this exemplary embodiment, the brake lining is also manufactured from carbon-fiber composite material and has two braking surfaces 27, 27' which can be selectively moved successively into use. All that is needed to change brake linings 26 or to exchange braking surfaces 27, 27' is to loosen screw bolts 14 and for brake lining 26 to be rotated about its axis of symmetry.

The end of each brake lever 9 and 10 opposite brake lining 16, 26 has an engagement surface 18 configured such that the engagement surfaces 18 converge toward one another in the mounted state. A pressure element 19, preferably of a roller-shape, is supported adjacent the engagement surfaces 18 of the respective brake levers 9 and 10 in fixed disposition between the side walls of U-shaped actuating lever 20, which in turn is supported in known manner on pivot axis 21 for a limited degree of rotational movement thereabout. A leaf spring 22 is fastened to actuating lever 20 and has a catch ring 23 on its end for engagement by an actuating linkage (not shown) operated when servicing of the spinning device is needed by a moveable service unit, such as a so-called spinning-start carriage, which automatically services the open-end rotor spinning devices.

In this manner, the pressure element 19 is selectively movable by the actuating lever 20 in direction B into and out of engagement with the engagement surfaces 18 to actuate pivoting movement of brake levers 9, 10 simultaneously into braking engagement of the brake linings 16 or 26 against the rotor shaft 2.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. In an open-end spinning device having a rotor housing, a spinning rotor disposed in the rotor housing, and a support-disk bearing defining a bearing nip, the spinning rotor being affixed to a shaft extending from the housing and rotatably supported in the bearing nip of the support-disk bearing for high speed rotation of the shaft and the rotor, a brake for the spinning rotor comprising at least one brake lever having a brake lining and being selectively actuable to contact the rotor shaft with the brake lining, wherein the brake lining comprises a carbon-fiber composite material.

2. The brake according to claim 1, wherein the brake lining is replaceably affixed on the brake lever.

3. The brake according to claim 1, wherein the brake lining is of a symmetrical configuration having multiple braking surfaces.

* * * * *